(12) United States Patent
Milvert et al.

(10) Patent No.: US 10,277,080 B2
(45) Date of Patent: Apr. 30, 2019

(54) INDUCTIVE HARNESS COUPLING AND COMMUNICATION FOR DISTRIBUTED ARCHITECTURES

(71) Applicant: Cummins Inc., Columbus, IN (US)

(72) Inventors: Thomas J. Milvert, Columbus, IN (US); Miguel A. Gonzalez, Jr., Columbus, IN (US); Joseph L. Gahimer, Columbus, IN (US); Adrian Delforge, Rockport, MD (US); Anirban De, Columbus, IN (US)

(73) Assignee: Cummins Inc., Columbus, IN (US)

( * ) Notice: Subject to any disclaimer, the term of this patent is extended or adjusted under 35 U.S.C. 154(b) by 444 days.

(21) Appl. No.: 14/605,596

(22) Filed: Jan. 26, 2015

(65) Prior Publication Data

US 2015/0210229 A1 Jul. 30, 2015

Related U.S. Application Data

(60) Provisional application No. 61/932,129, filed on Jan. 27, 2014.

(51) Int. Cl.
*B60L 5/00* (2006.01)
*B60R 16/03* (2006.01)
(Continued)

(52) U.S. Cl.
CPC .............. *H02J 50/80* (2016.02); *B60L 5/005* (2013.01); *B60R 16/03* (2013.01);
(Continued)

(58) Field of Classification Search
CPC ....... B60L 5/005; B60R 16/03; B60R 16/033; H02J 5/005; H02J 7/025; H02J 13/002;
(Continued)

(56) References Cited

U.S. PATENT DOCUMENTS 5,455,467 A 10/1995 Young et al.
5,892,299 A * 4/1999 Siewert ................... H02J 9/061
307/38

(Continued)

FOREIGN PATENT DOCUMENTS

EP 2 431 273 3/2012

*Primary Examiner* — Levi Gannon
(74) *Attorney, Agent, or Firm* — Foley & Lardner LLP

(57) ABSTRACT

An apparatus includes an AC power module that provides alternating current ("AC") electrical power; a power distribution wiring harness that receives the AC electrical power from the AC power module; a signal injection module that injects a communication signal on the power distribution wiring harness using signal modulation; and a plurality of inductive coupling modules, each inductive coupling module inductively receiving power and the communication signal from a location along the power distribution wiring harness, wherein each inductive coupling module is structured to transmit at least one of the power and the communication signal to one or more loads, wherein each inductive coupling module is separate from other inductive coupling modules in the plurality of inductive coupling modules.

22 Claims, 4 Drawing Sheets

(51) Int. Cl.
  *H02J 5/00* (2016.01)
  *H02J 50/12* (2016.01)
  *H02J 50/40* (2016.01)
  *H02J 50/80* (2016.01)
  *H04B 3/56* (2006.01)
  *H02J 50/10* (2016.01)
  *H02J 50/70* (2016.01)
  *H02J 13/00* (2006.01)

(52) U.S. Cl.
  CPC .......... *H02J 13/0024* (2013.01); *H02J 50/10* (2016.02); *H02J 50/12* (2016.02); *H02J 50/40* (2016.02); *H02J 50/70* (2016.02); *H04B 3/56* (2013.01); *H04B 2203/5416* (2013.01); *H04B 2203/5483* (2013.01); *Y10T 307/414* (2015.04)

(58) Field of Classification Search
  CPC ........ H02J 13/0024; H02J 17/00; H02J 50/10; H02J 50/12; H02J 50/40; H02J 50/80; H04B 3/54; H04B 3/56; H04B 5/0031; H04B 5/0037; H04B 5/0075; H04B 5/0087; H04B 2203/5416; H04B 2203/5483; Y10T 307/414
  USPC .......................................... 307/9.1, 10.1, 104
  See application file for complete search history.

(56) References Cited

U.S. PATENT DOCUMENTS

| | | | |
|---|---|---|---|
| 6,714,761 B1 * | 3/2004 | Anderson, III | H04B 7/22 455/505 |
| 6,850,070 B2 | 2/2005 | McQueeney et al. | |
| 7,193,931 B2 | 3/2007 | Pyle | |
| 7,566,984 B2 | 7/2009 | Blanchard | |
| 7,612,528 B2 | 11/2009 | Baarman et al. | |
| 7,649,283 B2 | 1/2010 | Tonn et al. | |
| 7,656,956 B2 | 2/2010 | King | |
| 7,888,876 B2 * | 2/2011 | Kitagawa | B60Q 1/1423 315/185 R |
| 7,960,854 B2 | 6/2011 | Paulus et al. | |
| 7,970,446 B2 | 6/2011 | Witkowski et al. | |
| 8,446,040 B2 * | 5/2013 | Paik | H02J 3/14 307/39 |
| 8,598,744 B2 * | 12/2013 | Choi | H01Q 7/00 307/104 |
| 8,604,637 B2 * | 12/2013 | Lienkamp | H01M 8/04559 307/10.1 |
| 9,231,412 B2 * | 1/2016 | Lisi | H02J 5/005 |
| 2002/0084786 A1 * | 7/2002 | Egami | B60Q 11/00 324/503 |
| 2004/0124703 A1 * | 7/2004 | Tani | B60R 16/0315 307/10.1 |
| 2007/0091519 A1 * | 4/2007 | Abe | H01F 38/14 361/38 |
| 2007/0296393 A1 | 12/2007 | Malpas et al. | |
| 2010/0097830 A1 * | 4/2010 | Wang | H02M 3/33576 363/126 |
| 2010/0110741 A1 * | 5/2010 | Lin | H02J 5/005 363/127 |
| 2010/0219693 A1 * | 9/2010 | Azancot | H02J 5/005 307/104 |
| 2011/0127845 A1 * | 6/2011 | Walley | H02J 5/005 307/104 |
| 2011/0254379 A1 * | 10/2011 | Madawala | H02J 5/005 307/104 |
| 2013/0207479 A1 * | 8/2013 | Vendik | H01F 27/006 307/104 |
| 2013/0208775 A1 * | 8/2013 | Wang | H04B 3/46 375/224 |
| 2015/0236517 A1 * | 8/2015 | Deguchi | H02J 5/005 307/104 |

* cited by examiner

INDUCTIVE HARNESS COUPLING AND COMMUNICATION FOR DISTRIBUTED ARCHITECTURES

CROSS-REFERENCE TO RELATED APPLICATIONS

This application claims the benefit of priority to U.S. Provisional Patent Application No. 61/932,129, entitled "INDUCTIVE HARNESS COUPLING AND COMMUNICATION FOR DISTRIBUTED ARCHITECTURES," filed Jan. 27, 2014, which is incorporated herein by reference in its entirety.

TECHNICAL FIELD

The present disclosure relates to power transmission. More particularly, the present disclosure relates to systems and methods of transmitting power and communication signals.

BACKGROUND

Typical vehicles include an assortment of electrically-powered components. These components may include radios, speakers, injectors, actuators, sensors, and the like. To power these components, a wiring harness is assembled, attached to an electrical power source within the vehicle (e.g., a battery), and individually connected (i.e., a point-to-point connection scheme) to each and every electrically-powered component within the vehicle. Due to the myriad of places that the electrically-powered components may be located, the wiring harness is typically very long, bulky, and consequently, unwieldy.

SUMMARY

One embodiment relates to an apparatus. The apparatus includes an AC power module structured to provide alternating current ("AC") electrical power; a power distribution wiring harness structured to receive the AC electrical power from the AC power module; two or more electrically-powered loads in a power balanced relationship with one another; and a plurality of inductive coupling modules wirelessly coupled to the power distribution wiring harness and electrically coupled to the two or more electrically-powered loads, wherein at least one inductive coupling module is structured to inductively receive AC electrical power from the power distribution wiring harness and transmit the AC electrical power to at least one of the two or more electrically-powered loads. According to one embodiment, a different wiring harness is used for each set of two or more electrically-powered loads in a balanced power relationship. By coupling power balanced loads together, reception and providing the AC electrical power (or DC power if converted) to the two or more power balanced loads is achieved or substantially achieved without various electrical current management or dissipation devices. In turn, the apparatus may readily be implemented in various embodiments (e.g., vehicle-to-vehicle) without excessive modification in order to be used right away.

Another embodiments relates to an apparatus. The apparatus includes an AC power module that provides alternating current ("AC") electrical power; a power distribution wiring harness that receives the AC electrical power from the AC power module; a signal injection module that injects a communication signal on the power distribution wiring harness using signal modulation; and a plurality of inductive coupling modules, each inductive coupling module inductively receiving power and the communication signal from a location along the power distribution wiring harness, wherein each inductive coupling module is structured to transmit at least one of the power and the communication signal to one or more loads, wherein each inductive coupling module is separate from other inductive coupling modules in the plurality of inductive coupling modules. According to one embodiment, the apparatus is included with a vehicle. Accordingly, the one or more loads may include one or more electrically-powered components in the vehicle. Therefore, the apparatus provides a system and structure for wirelessly transferring power from a power source to the one or more electrically-powered components. Accordingly, electrical couplers used to connect each component to the harness are reduced/eliminated. This provides the apparatus with a modularity that makes it applicable with many vehicles (i.e., vehicle-specific wiring harnesses are unneeded).

Still another embodiment relates to a vehicle. The vehicle includes an engine; a battery structured to provide direct current ("DC") power; an AC power module electrically coupled to the battery, the AC power module including a DC-to-AC inverter structured to invert the direct current power from the battery to alternating current ("AC") electrical power; a power distribution wiring harness that includes at least two wires, the power distribution wiring harness electrically coupled to the engine and the AC power module, wherein the power distribution wiring harness is structured to receive AC electrical power from the AC power module; two or more loads, wherein the two or more loads are in a power balanced relationship with each other; and a plurality of inductive coupling modules wirelessly coupled to the power distribution wiring harness and electrically coupled to the two or more loads in the vehicle, and wherein at least one inductive coupling module is structured to inductively receive AC electrical power from the power distribution wiring harness and transmit the AC electrical power to at least one of the two or more loads in the vehicle.

Still another embodiment relates to a vehicle. The vehicle includes an internal combustion engine; an AC power module that provides alternating current ("AC") electrical power to the engine; a power distribution wiring harness for the engine that receives electrical power from the AC power module; and a plurality of inductive coupling modules, each inductive coupling module wirelessly receiving power from a location along the power distribution wiring harness and transmitting the power to one or more loads of the engine, wherein each inductive coupling module is separate from other inductive coupling modules in the plurality of inductive coupling modules.

Yet another embodiment relates to a method. The method includes providing, by an AC power module, alternating current ("AC") electrical power; providing two or more electrically-powered loads in a power balanced relationship with each other; receiving, by a power distribution wiring harness in a vehicle, the AC electrical power; transmitting, by the power distribution wiring harness, the AC electrical power to an inductive coupling module, wherein the AC electrical power is transmitted inductively from the power distribution wiring harness to the inductive coupling module; and transmitting, by the inductive coupling module, the received AC electrical power to at least one of the two or more electrically-powered loads.

Yet another embodiment relates to a method. The method includes receiving, by a power distribution wiring harness in a vehicle, alternating current ("AC") electrical power from an AC power source; receiving, by the power distribution wiring harness in a vehicle, a modulated communication signal; transmitting, by the power distribution wiring harness, the AC electrical power and the modulated communication signal to an inductive coupling module, wherein the AC electrical power and the modulated communication signal are transmitted wirelessly from the power distribution wiring harness to the inductive coupling module; and transmitting, by the inductive coupling module, at least one of the AC electrical power and the modulated communication signal to one or more loads in the vehicle.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
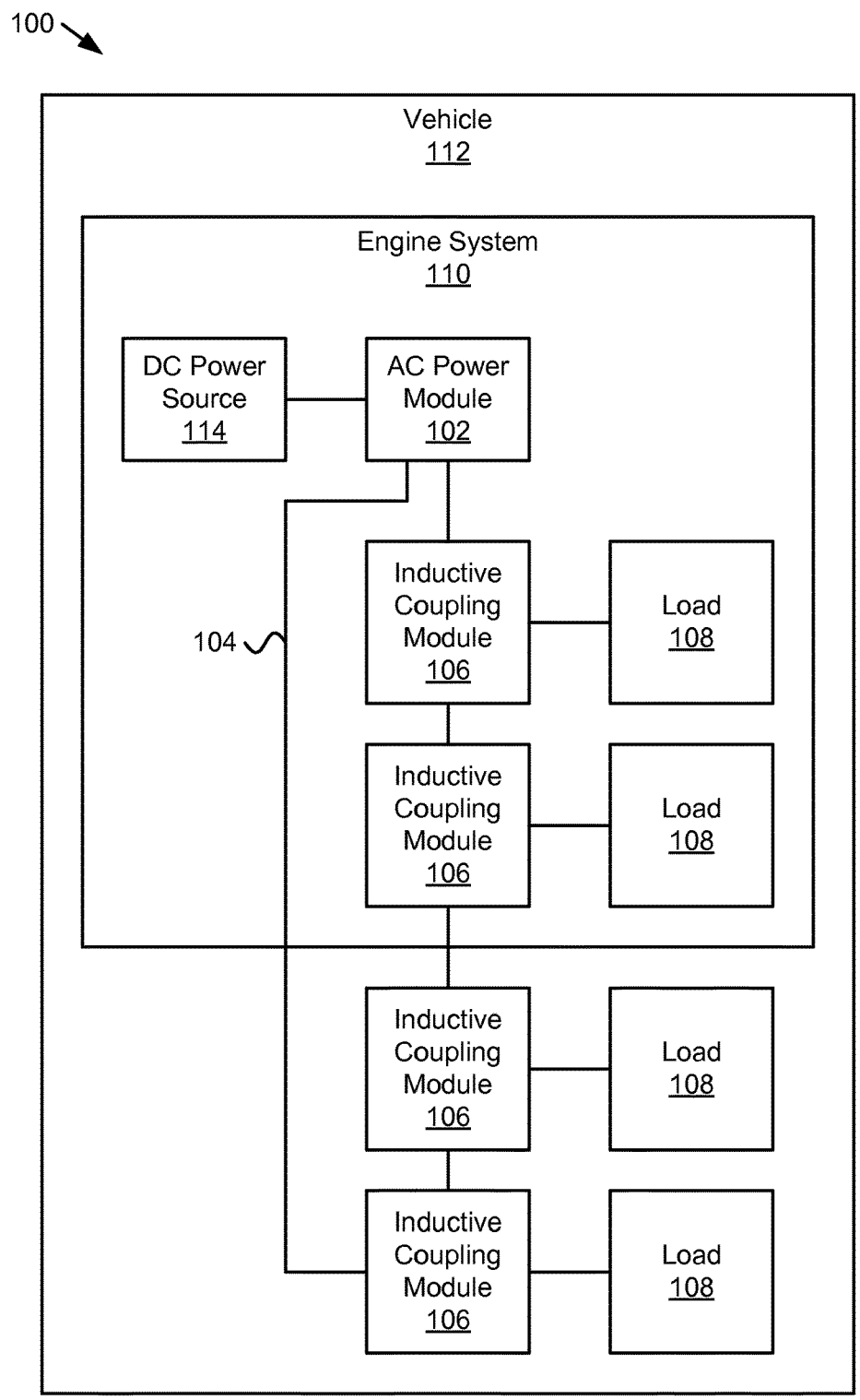
FIG. 1 is a schematic block diagram of one embodiment of an inductively coupled power distribution system.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, some aspects of the present invention may take the form of an entirely hardware embodiment, as computer instructions on a non-transient computer readable storage medium embodiment (including firmware, microcode, etc.) or an embodiment combining the non-transient computer readable storage medium and hardware aspects that may all generally be referred to herein as a "circuit," "module," or "system."

Thus, in certain embodiments, the system disclosed herein further includes a controller structured to control operation of the system. In certain embodiments, the controller forms a portion of a processing subsystem including one or more computing devices having memory, processing, and communication hardware. The controller may be a single device or a distributed device, and the functions of the controller may be performed by hardware and/or as computer instructions on a non-transient computer readable storage medium. In certain embodiments, the controller includes one or more modules structured to functionally execute the operations of the controller. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or as computer instructions on a non-transient computer readable storage medium, and modules may be distributed across various hardware or computer based components. More specific descriptions of certain embodiments of controller operations are included in the section referencing FIG. 1. Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Many of the functional units described in this specification have been labeled as modules, in order to more particularly emphasize their implementation independence. For example, a module may include a hardware circuit comprising custom VLSI circuits or gate arrays, off-the-shelf semiconductors such as logic chips, transistors, or other discrete components. A module may also be fully or partially implemented in programmable hardware devices such as field programmable gate arrays, programmable array logic, programmable logic devices or the like.

Some modules or portions of modules may also be implemented for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module (e.g., a distributed architecture).

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist fully, or at least partially, as electronic signals on a system or network. Where a module or portions of a module are implemented in non-transient machine readable instructions, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing.

In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code, hardware, or both. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent hardware, a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Referring now to FIG. 1, a schematic block diagram of one embodiment of an inductively coupled power distribution system 100 is shown. The power distribution system 100 includes an AC power module 102, a power distribution wiring harness 104, and several inductive coupling modules 106 connected to loads 108, an engine system 110, a vehicle 112, and a DC power source 114, which are described below. It should be understood that the vehicle 112 and engine system 110 may include a wide range of vehicles and engine system: from full electrical vehicles to hybrid vehicles (internal combustion engine and electrically-powered vehicles) to internal combustion engine power vehicles. All such variations are intended to fall within the spirit and scope of the present disclosure.

The inductively coupled power distribution system 100 includes an AC power module 102 that provides electrical power (i.e., alternating current electrical power) with an alternating current ("AC") voltage waveform and a power distribution wiring harness 104 that receives electrical power from the AC power module 102. Along the power distribution wiring harness 104 are inductive coupling modules 106 that receive power from the power distribution wiring harness 104 and that transmit the power to the loads 108. According to one configuration, the inductive coupling modules 106 receive power from the power distribution wiring harness 104 via electromagnetic induction. Accordingly, the inductive modules 106 and harness 104 may be free from physical, mechanical contacts (i.e., "contactless"). In one embodiment, the AC power module 102 and at least a portion of the power distribution wiring harness 104 are within an engine system 110, such as an internal combustion engine system. The engine system 110 may include a motor and controls or may include additional engine components such as a radiator, at least part of a fuel system, etc. In one embodiment, the engine system 110 is part of a vehicle 112, such as a truck, an automobile, a tractor, etc. In another embodiment, the engine system 110 is part of a power generation system (not shown) such as a stationary electric generator. One skilled in the art will recognize other systems that may include a AC power module 102, a power distribution wiring harness 104, and one or more inductive coupling modules 106 that provide power to loads 108.

In one embodiment, the AC power module 102 is coupled to a DC power source 114. For example, the AC power module 102 may include an inverter that inverts direct current ("DC") power from the DC power source 114 to an AC voltage waveform. For example, the DC power source 114 may include a battery, such as a vehicle battery and the AC power module 102 may include an inverter or other device that converts/inverts DC power to an AC waveform. In another embodiment, the inductively coupled power distribution system 100 does not include a DC power source 114 and power to the engine system 110 and/or vehicle 112 is derived from the AC power module 102. For example, the AC power module 102 may include an AC generator that generates an AC waveform, such as an induction (asynchronous) generator. In another embodiment, the AC power module 102 may receive power from an AC voltage source such as a building AC power system. The power distribution system 100 may also include an energy storage source, such as a battery and power from the battery may be converted to AC power when the AC power system is not available.

The AC voltage waveform may include a sinusoidal fundamental AC waveform and one or more AC waveforms each with a frequency different than the fundamental AC waveform, such as harmonics of the fundamental AC waveform. In one embodiment, the AC waveform includes a sinusoidal fundamental AC waveform that has a frequency that is lower than one or more frequencies of a communication signal riding on the AC waveform. For example, the one or more frequencies of the communication signal may be ten times or more than the frequency of the fundamental AC waveform. The frequency of the fundamental AC waveform, in various embodiments, may be 60 hertz ("HZ"), 400 Hz, 10 kilo Hz ("kHz"), 100 kHz, etc. while the frequencies of the communication signal may be in the kHz or the mega Hz ("MHz") range.

In one embodiment, the power distribution wiring harness 104 includes at least two wires, such as a "hot" conductor and a neutral conductor that may be a grounded conductor. In another embodiment, the power distribution wiring harness 104 is for a three-phase power system and includes at least three phase conductors (i.e., A, B, and C) and may include a neutral conductor. In one embodiment, the power distribution wiring harness 104 is distributed and includes conductors that connect to a main set of conductors. In another embodiment, the power distribution wiring harness 104 includes a power loop where a hot conductor is configured in a loop and a neutral is also configured in a separate loop, which may run parallel to the hot conductor loop. A looped system may provide redundancy. In another embodiment, conductors of the power distribution wiring harness 104 are twisted, such as in twisted pairs.

In one embodiment, one or more inductive coupling modules 106 each receive power inductively from the power distribution wiring harness 104. In FIG. 1, the inductive coupling modules 106 are shown intercepting the power distribution wiring harness 104, but one skilled in the art will recognize that some configurations of an inductive coupling module 106 may be located adjacent to conductors of the power distribution wiring harness 104 without a break in the conductors of the power distribution wiring harness 104. In another embodiment, a location with an inductive coupling module 106 may include a portion of the inductive coupling module 106 in line with at least one of the conductors of the power distribution wiring harness 104. Various embodiments of the inductive coupling module 106 are discussed further with respect to FIGS. 3A and 3B.

In one embodiment, the inductive coupling modules 106 and associated loads 108 are located in the engine system 110. In another embodiment, the inductive coupling modules 106 and associated loads 108 are associated with the engine system 110 and the vehicle 112. In another embodiment, the inductively coupled power distribution system 100 may be independent of both an engine system 110 and a vehicle 112 and may provide power distribution for another device, such as an appliance, a computer, or other device requiring electrical power.

According to one embodiment, two or more of the loads 108 are in a power balanced relationship with one another. A power balanced relationship does not necessarily mean that each of the two or more loads require the same amount of electrical current or power to operate. Rather, a power balanced relationship is meant to be broadly interpreted to indicate a relationship between two or more loads (e.g., an oxygen sensor and an accelerator pedal position sensor) that utilize an approximately equal amount of power to operate (e.g., within a predefined percentage). To that end, one of ordinary skill in the art would recognize various loads, for example in a vehicle, that require approximately the same amount of power to operate. In certain embodiments, electrically-powered loads may be grouped together based on their power consumption or current draw needed to function (i.e., grouped together based on being in a power balanced relationship). For example, the groupings may correspond with a first group of high-power consuming loads, a second group of medium-power consuming loads, and a third group of low-power consuming loads. The low-power consuming loads may correspond to a sensor circuit (i.e., a group of sensors in the vehicle that only need a certain amount of power (e.g., below a threshold) to operate). For example, the sensor circuit may include an oxygen sensor, an accelerator pedal position sensor, an ammonia sensor in an exhaust gas aftertreatment sensor, a headlight sensor, etc. In comparison, medium-power consuming loads may include an air compressor and a fan. Finally, for example, a high-power consuming load may include an alternator.

According to one embodiment, each group of loads is provided with a dedicated power distribution wiring harness and a dedicated plurality of inductive coupling modules (e.g., one or more inductive coupling modules for each load in the particular group of loads). In this regard, the current amount transmitted on the power distribution wiring harness requires little management. In other words, each of the power balanced loads in the grouping requires approximately the same amount of electrical current. Utilizing dedicated power distribution wiring harnesses permits transmission of only the required operating current or operating current range for each grouping. Advantageously, each grouping therefore does not need or requires only a few additional current management/dissipation devices because the current or power transmitted by the dedicated power distribution wiring harness is tailored to that grouping of power balanced loads.

According to an alternate embodiment, only one power distribution wiring harness is utilized. In this case, one or more current management/dissipation devices (shunting) may also be provided. In operation, many types of operating currents may be needed for many of the loads (e.g., a milliamp current for one load and a few ampere current for another load, etc.). Accordingly, a transmission of only one limited range of current values may be inapplicable/insufficient for many of the loads. In this situation, transformers or shunting devices may be utilized to regulate the amount of current for each load. Compared to the previous embodiment, this configuration is advantageous in the fact that only one power distribution wiring harness may be required.

According to still another embodiment, an electrification device may be included with each load or with each group of power balanced loads. The electrification device may be structured as a power storage device (e.g., a capacitor, a battery, etc.). The power storage device(s) may periodically or constantly receive power from the power distribution wiring harness 104 to charge the power storage devices. The power storage device is structured to selectively provide electrical power to the load or to one or more loads in the group of power balanced loads. In another configuration, the power storage device may be structured to selectively provide electrical power to the inductive coupling module, which the inductive coupling module then provides the electrical power to the load. In operation, if only one power distribution wiring harness is used, the AC power module 102 may be structured to provide different levels of electrical current, for example: high levels of electrical current for high powered loads, medium levels of electrical current for medium powered loads, and low levels of electrical current for low powered loads. In each transmission instance, the inductive coupling modules 106 that correspond with each current transmission level that is not presently being transmitted may be powered off or otherwise disconnected from the wiring harness 104. While those disconnected inductive coupling modules 106 may not for a certain amount of time receive power from the power distribution wiring harness 104, the inductive coupling modules 106 or specific loads may still receive power from the power storage devices. Thus, the use of the power storage devices in this manner may function to regulate the power distribution to power balanced loads without requiring dedicated power distribution wiring harnesses.

Figure 2:
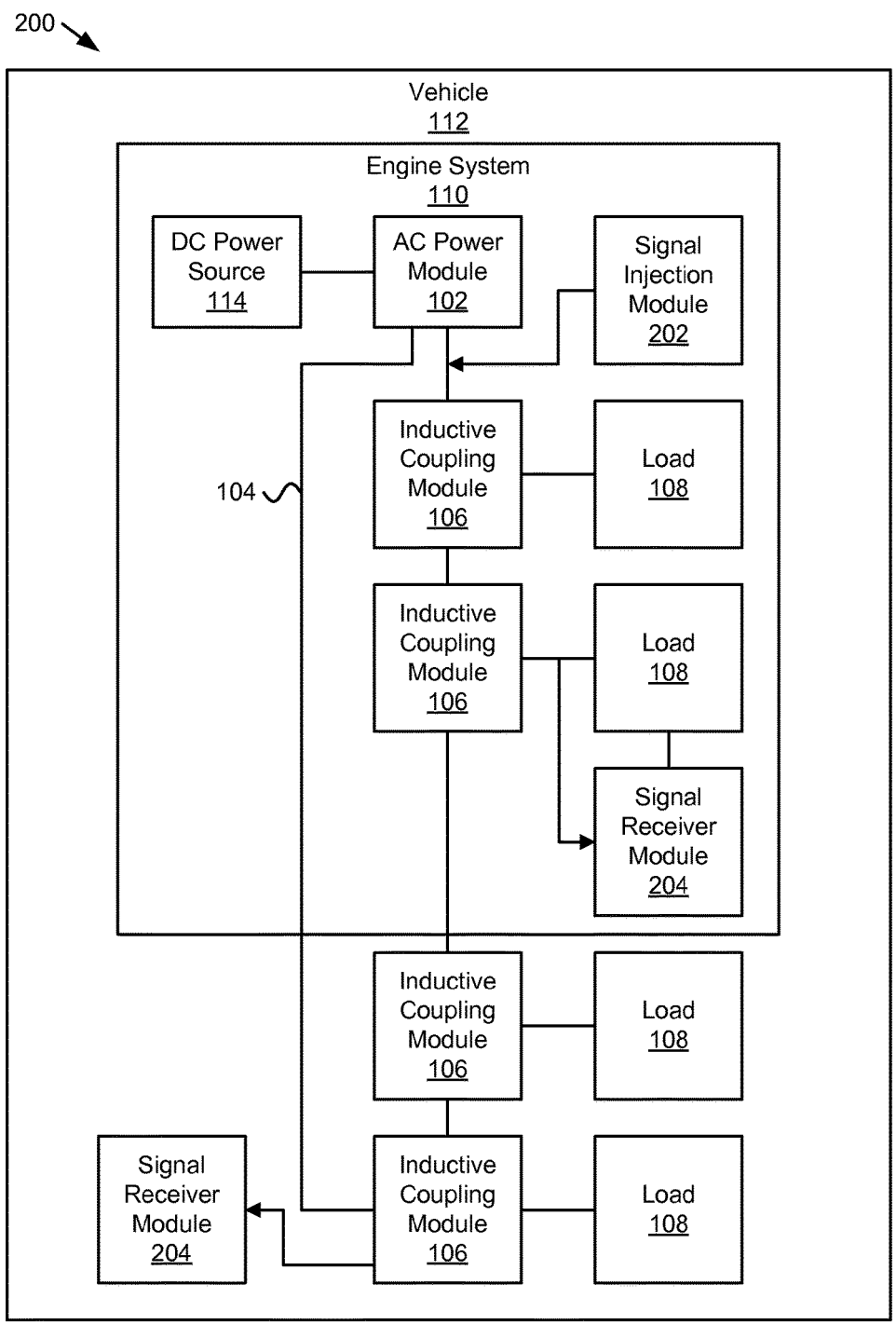
FIG. 2 is a schematic block diagram of another embodiment of an inductively coupled power distribution system.

FIG. 2 is a schematic block diagram of another embodiment of an inductively coupled power distribution system 200. The power distribution system 200 includes an AC power module 102, a power distribution wiring harness 104, and several inductive coupling modules 106 connected to loads 108, an engine system 110, a vehicle 112, and a DC power source 114, which are substantially similar to those described above in relation to the power distribution system 100 of FIG. 1. The power distribution system 200 also includes a signal injection module 202 and signal receiver modules 204, which are described below.

In one embodiment, the inductively coupled power distribution system 200 includes a signal injection module 202 that injects a communication signal on the power distribution wiring harness 104. The communication signal includes one or more frequencies that are higher than, lower than, or the same as a fundamental frequency of the AC voltage waveform. The signal injection module 202 may use a frequency generated by the AC power module 102 as a carrier frequency and the communication signal may be combined with the AC voltage waveform for both power distribution and communications. According to one embodiment, the signal injection module 202 is structured to inject a communication signal that is specific to a particular load.

According to one embodiment, the signal injection module 202 is structured to inject the communication signal during a predefined electrical noise range of operation in the system (e.g., vehicle 112). According to one embodiment, the predefined electrical noise range of operation corresponds with a low electrical noise operating range. During operation of the vehicle 112, the components of the vehicle generate electromagnetic interference. During transient moments of operation, the electromagnetic interference may correspond with a low amount of interference. At which point, the signal injection module 202 provides the communication signal. Due to the low amount of interference, the communication signal is less likely to be adversely impacted by the interference. According to one embodiment, the signal injection module 202 is structured to inject a burst communication signal during the low electrical noise operating range. The burst communication signal may include multiple messages for one or more of two or more power balanced loads.

Determination of a low electrical noise operating range is highly configurable. For example, one or more pieces of electromagnetic measuring devices may be included in the vehicle and maintain a history log of electromagnetic interference in the vehicle. Based on the history log, an average or median value of electromagnetic interference may be determined and a low electromagnetic interference range prescribed. When the measured electromagnetic interference is within the low electromagnetic interference range, the signal injection module 202 is structured to provide the communication signal (or burst signal). In another example, an amount of electromagnetic interference in the system may be determined and/or estimated based on operation of one or more loads. For example, a high power output from the alternator may represent a high amount of electromagnetic interference. The signal injection module 202 may be structured to provide the communication signal or burst of communication signal when the alternator is operating in a predefined low operating range (corresponding to a low electrical noise operating range). While the determination above is based on only one load device (i.e., the alternator), in other embodiments, the determination of electrical noise may be based on the operating characteristics of two or more devices. In each configuration, the signal injection module 202 is structured to determine or receive an indication of a low electrical noise operating range existing and, consequently, provide the communication signal. According to an alternate embodiment, various amounts and placements of electromagnetic shielding may be included with the vehicle 112 or system in order to shield the communication signal from interference, such that the signal injection module 202 may provide the communication signal at any time. All such variations are intended to fall within the spirit and scope of the present disclosure.

In one embodiment, the communication signal includes one or more instructions, messages, commands, controls, etc. for one or more loads 108. The one or more instructions, messages, commands, controls, etc. may include data, values, and the like. In another embodiment, the communication signal is for other communications, such as data transfer to a computing system, operating system commands, signals for reporting a condition of the power distribution system 200 or other communications known to those in the art. The communication signal, in one embodiment, includes several communication signals or messages. In one embodiment, the communication signal includes an address along with a command, message, data, etc. The address may allow a device with the address to receive the communication signal while other devices may ignore the communication signal.

In one embodiment, the signal injection module 202 is a controller or is controlled by a controller. The controller, for example, may control devices and systems within the power distribution system 200, within the engine system 110, within the vehicle 112, and/or within some other system or network. For example, the signal injection module 202 may be controlled by a processor and the communication signal may be part of network communications.

In one embodiment, the power distribution system 200 includes a signal receiver module 204 that filters the communication signal from power received from a wireless coupling module 106. For example, a signal receiver module 204 may be located downstream from an inductive coupling module 106. In another example, a signal receiver module 204 may be associated with a load 108. For instance, the signal receiver module 204 associated with a load 108 may connect to the load 108 and may control the load 108 based on the received communication signal. In one embodiment, the signal receiver module 204 may include an address.

While FIG. 2 depicts two signal receiver modules 204, one skilled in the art will understand that the power distribution system 200 may include numerous signal receiver modules 204. In one instance, a signal receiver module 204 may receive a communication signal directly from the power distribution wiring harness 104. In one embodiment, a signal receiver module 204 connects to a computing device (not shown) or other device (not shown) not receiving power from the power distribution system 200. For completeness, the computing device or other device receives power from one or more power sources (not shown), such as a battery like a coin cell.

In another embodiment, the power distribution system 200 includes one or more additional signal injection modules 202 to allow bidirectional communications. For example, a signal injection module 202 and a signal receiver module 204 may be paired to both send and receive communication signals. In the embodiment, the inductive coupling module 106 may be able to pass communication signals bidirectionally.

Figure 3A:
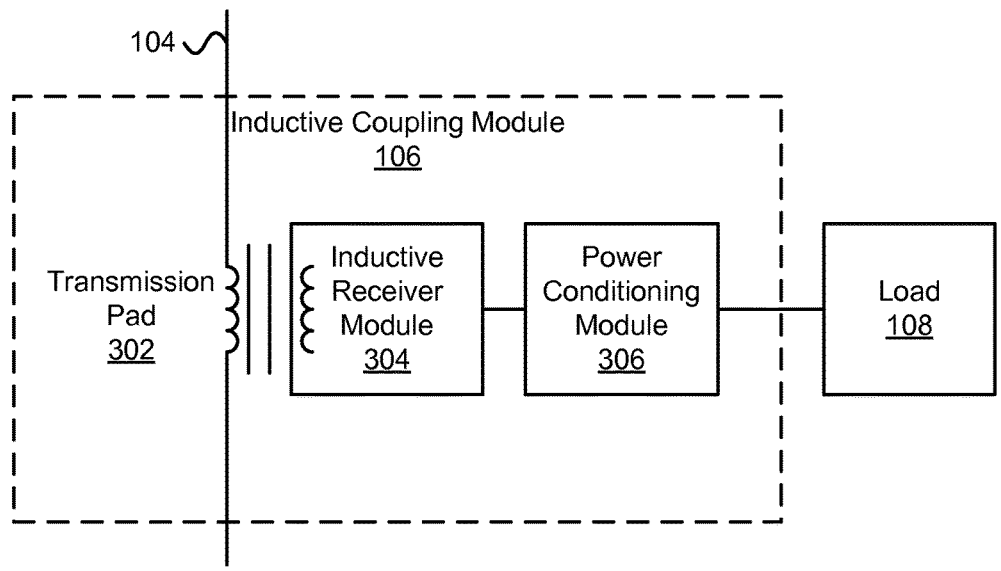
FIG. 3A is a schematic block diagram of one embodiment of an inductive coupling module.

FIG. 3A is a schematic block diagram of one embodiment of an inductive coupling module 106. In the embodiment, the inductive coupling module 106 includes one or more of a transmission pad 302 in the power distribution wiring harness 104, an inductive receiver module 304, and a power conditioning module 306. According to an exemplary embodiment, the inductive receiver module 304 receives at least one of power and data (referred to collectively as "signals") from the transmission pad 302 via the harness 104. The inductive receiver 304 may transfer the signals via power conditioning module 306 (e.g., to rectify the power signal from AC to DC) before transmitting it to the load 108. In one example, the signals from transmission pad 302 to inductive receiver 304 are transmitted inductively. As such, traditional wired, physical connections are eliminated (i.e., contact-less connections).

According to one example, the inductive coupling module 106 may be part of a resonance enhanced magnetic induction system. In a resonance enhanced magnetic induction system, the AC waveform may include a frequency that is a resonant frequency. The AC power module 102 may generate an AC waveform with a specific frequency, and components in the AC power module 102 or other components within the power distribution wiring harness 104 may be tuned so that the specific frequency is a resonant frequency, which the AC power module 102 may amplify. For example, the AC power module 102 and inductive coupling module 106 may include components of a wireless power transfer system that includes an LLC resonant inverter, transmission pad 302, a receiver pad, and an LLC resonant converter. The AC power module 102 may include an H-bridge along with an LLC resonant inverter and converter section and a transmission pad 302. The inductive receiver module 304 may include the receiver pad, such that power is transmitted inductively from the transmission pad 302 to the receiver pad (i.e., receiver module 304). In other words, the LLC converter would be placed on the front end of the system and combined with the AC power module 102, where the LLC converter is creating the proper power signal to be placed on the distribution harness 104. Components of the resonance enhanced magnetic induction system may be designed with a particular minimum coupling coefficient between the transmission pad 302 and receiver pad. The coupling coefficient is typically affected by alignment and distance between the transmission pad 302 and receiver pad. One or more mechanical fasteners, attachment mechanisms, etc. may be used to maintain the receiver pad in a position to maintain the coupling coefficient above a minimum value. Maintaining the coupling coefficient above a minimum value may allow efficiency of the wireless power transfer to be above a specified level.

In one embodiment, the inductive coupling module includes a transmission pad 302 located in proximity to an inductive receiver module 304. The transmission pad 302 may include a magnetic component and/or coiled wiring to capture magnetic lines of flux generated by an electromagnetic field created by the AC signal, to couple the primary distribution harness (i.e., harness 104) to a secondary distribution harness (i.e., inductive receiver module 304) in order to transmit at least one of a communication signal (i.e., from signal injection module 202) and power to one or more loads in a power and/or communications system. In another embodiment, the transmission pad 302 is a wire of the power distribution wiring harness 104. For example, the power distribution wiring harness 104 may be twisted prior to and after the wireless coupling module 106 and the twisting may be halted at the inductive coupling module 106. The inductive receiver module 304 may also include a receiver pad with a magnetic component and/or coiled wiring along with additional resonant components, such as capacitors, inductors, etc. In the embodiment, the inductive receiver module 304 reacts to the electromagnetic field generated by the transmission pad 302 and generates an AC waveform. In one embodiment, the resonant frequency is designed for optimum power transfer while minimizing negative effects, such as skin effect, unwanted electromagnetic interference, etc. The resonant frequency, for example, may be above 1 kHz and below 1 MHz. In example, the resonant frequency may be 10 kHz or other similar frequency.

In one embodiment, the AC waveform includes the resonant frequency. The power conditioning module 306, in one embodiment, converts the AC waveform received by the inductive receiver module 304 to a DC waveform. For example, the power conditioning module 306 may include a rectifier section. In another embodiment, the power conditioning module 306 includes an AC-to-DC converter and regulator section to regulate the DC output voltage of the power conditioning module 306 before providing the DC voltage to the load 108. In another embodiment, the power conditioning module 306 filters the AC waveform and passes a sinusoidal or near sinusoidal waveform to the load 108. In another embodiment, a signal receiver module 204 controls voltage from the inductive coupling module 106 to the load 108. In another embodiment, power from the power conditioning module 306 is passed to the load 108 and the signal receiver module 204 controls the load directly.

Figure 3B:
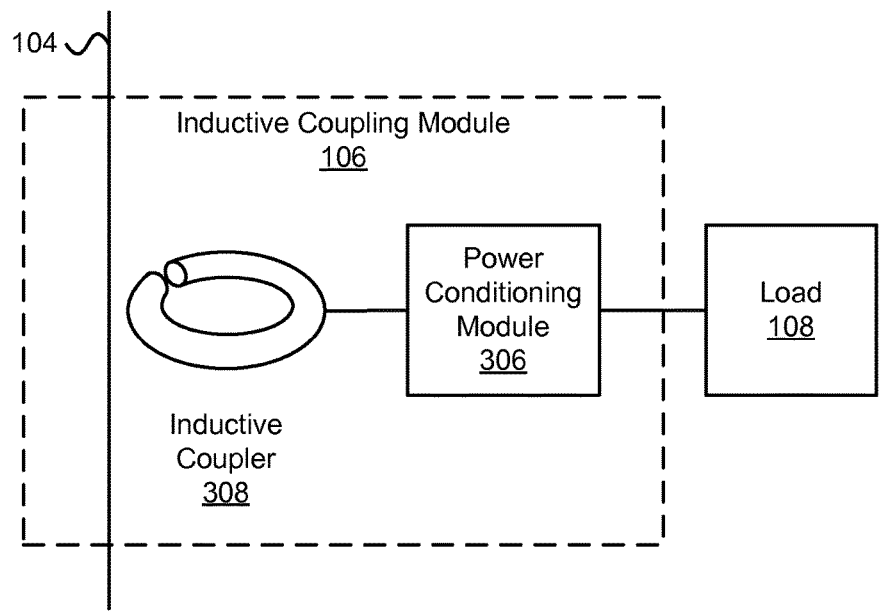
FIG. 3B is a schematic block diagram of another embodiment of an inductive coupling module.

FIG. 3B is a schematic block diagram of another embodiment of an inductive coupling module 106. In the embodiment, the inductive coupling module 106 includes an inductive coupler 308 along with a power conditioning module 306 that may be substantially similar to the power conditioning module 306 described above in relation to FIG. 3A. According to an exemplary embodiment, the inductive coupler 308 is composed of a magnetic material (e.g., a ferrous material), such that magnetic fields on the primary winding of the inductive coupler 308 are induced onto the secondary winding of the coupler 308. According to one embodiment, the inductive coupler 308 may be configured as a split-ring resonator ("SRR") that, when placed in a periodic structure, helps to manipulate the received electromagnetic waves (i.e., power or communication signals) before transmitting the waves to the power conditioning module 306. Like above, the SRR, in one embodiment, is made of magnetic materials, such as a ferrous material. The SRR typically includes a gap that serves as a capacitance and the SRR may serve as an inductor based on the self-inductance of the SRR. Typically, the gap is a fixed distance and as minimal as possible to prevent and limit flux leakage (the same is true of a ferrous inductive coupler 308). The SRR, in one embodiment, is a tunable resonant structure. The SRR may be coupled to the power distribution wiring harness 104 such that the AC waveform generated by the AC power module 102 is transmitted inductively to the SRR of the inductive coupler 308. In one embodiment, magnetic flux penetrating the SRR induces a rotating current in the SRR, which establishes a localized field. In one embodiment, the gap in the SRR is designed to support resonant wavelengths much larger than the diameter of the SRR. According to various other embodiments, the inductive coupler 308 may include other shapes, such as cylindrical, shell, or a planar structure. Other components in the inductive coupler 308, such as wiring, transmits the received power to the power conditioning module 306, which then transmits power to a load 108. As described in relation to FIG. 3A, a signal receiver module 204 may also interact with the inductive coupling module 106 and/or load 108.

Other contact-less power transfer technologies may also be used in the power distribution systems 100, 200 described above. Other examples may include magnetic induction with electromagnetically induced transparency ("EIT"), conductive coupling, radio frequency energy harvesting, and other known methods of contact-less power transfer. An inductively coupled power distribution system 100, 200 with a power distribution wiring harness 104 may be routed through an engine system 110, through a vehicle 112, or through another structure and inductive coupling modules 106 that may connect to the power distribution wiring harness 104 at a convenient location to tap into power and communication signals in the power distribution wiring harness 104. The inductive coupling module 106 and the power distribution wiring harness 104 may transfer power through the inductive coupling module 106 without interrupting the power distribution wiring harness 104 wiring. For example, an inductive coupling module 106 may clip to the power distribution wiring harness 104 without the power distribution wiring harness 104 being cut. Such an arrangement may increase system reliability due to fewer connections that may fail. In addition, the power distribution wiring harness 104 may be designed without connections, such that the inductive coupling modules 106 may connect at any convenient location. The addition of an inductive coupling module 106 at a later time may be easier than a connection requiring cutting the power distribution wiring harness 104. One of skill in the art will recognize other advantages of an inductively coupled power distribution system 100, 200 with inductive power transfer.

Figure 4:
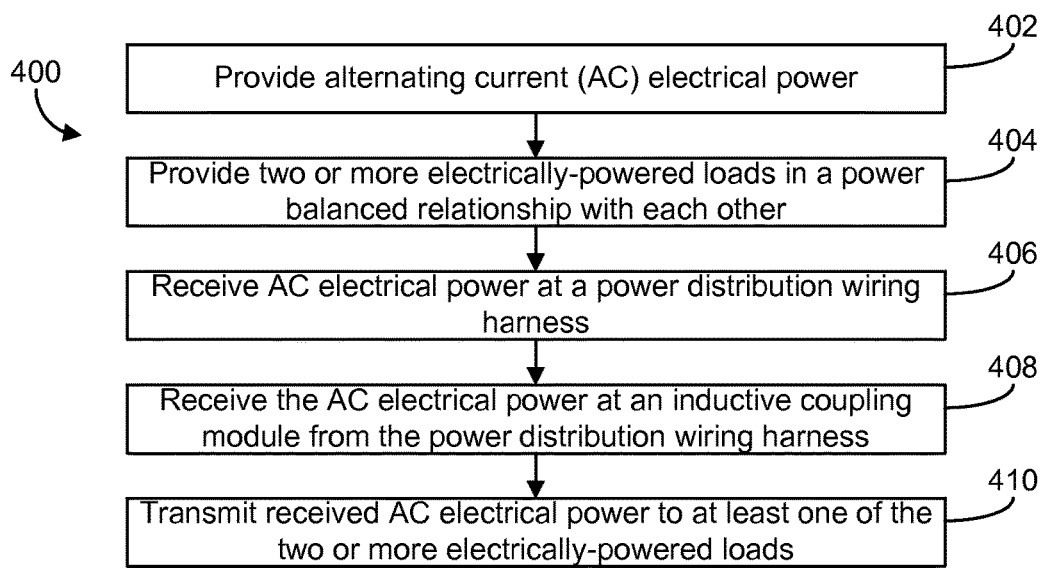
FIG. 4 is a flowchart of a method of providing at least one of power and communication data to one or more loads in a system.

Referring now to FIG. 4, a method 400 of providing at least one of power and communication data in a system is shown according to one embodiment. In one example, the system is a vehicle and the method 400 is implemented with the components described herein above. Accordingly, reference may be made to one or more of those components in explanation of the method 400.

At process 402, alternating current ("AC") electrical power is provided. In one embodiment, an AC power module such as AC power module 102 provides the AC electrical power. The AC power module 102 may include an AC power generator and/or may invert DC power from a DC power source (e.g., a battery) to the AC electrical power. At process 404, two or more electrically-powered loads are provided that are in a power balance relationship with one another. As described above, a power balanced relationship refers to the fact that the two or more loads require the same or substantially the same amount of power to be driven/operated. At process 406, the AC electrical power is received by, for example, a power distribution wiring harness such as power distribution wiring harness 104. The power distribution wiring harness 104 may have any type of structure. For example, when method 400 is used with a vehicle, the wiring harness may be structured as a twisted-pair. At process 408, the AC electrical power is received by an inductive coupling module, such as inductive coupling module 106, from the power distribution wiring harness. In this regard, the AC electrical power is received inductively by the inductive coupling module. At process 410, the inductive coupling module transmits the received AC electrical power to at least one of the two or more electrically powered loads.

According to one embodiment, prior to transmission of the received AC electrical power, the AC electrical power is converted to DC electrical power to accommodate DC-driven loads. In this case, an AC-to-DC converter may be included with the inductive coupling module or be electrically coupled to the inductive coupling module.

Method 400 may be modified to include communication signals as well. For example, method 400 may further include receiving a modulated communication signal and filtering the modulated communication signal from the power received from the inductive coupling module. In this regard, method 400 may be used with the components described above and their corresponding structure/functionality.

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
an AC power module structured to provide alternating current ("AC") electrical power;

a power distribution wiring harness structured to receive the AC electrical power from the AC power module;

a first group of loads in a power balanced relationship with each other such that each load in the first group of loads consumes approximately a same amount of power during operation;

a second group of loads in a power balanced relationship with each other, the second group consuming less power than the first group, and wherein each load in the second group of loads consumes approximately a same amount of power during operation;

a plurality of inductive coupling modules wirelessly coupled to the power distribution wiring harness, and electrically coupled to at least one of the first group and the second group to inductively receive AC electrical power from the power distribution wiring harness and transmit the AC electrical power to at least one of the first group and the second group; and a signal injection module structured to inject a communication signal on the power distribution wiring harness using signal modulation during a transient moment of operation corresponding to a low electrical noise operating range of electromagnetic interference generated by components of a vehicle, wherein individual loads in the first group of loads are different than individual loads in the second group of loads.

2. The apparatus of claim 1, further comprising a power storage device electrically coupled to one of the first group or the second group and structured to inductively receive AC electrical power from the power distribution wiring harness and to selectively provide electrical power to at least one of the first group or the second group.

3. The apparatus of claim 1, further comprising:

a signal receiver module structured to filter the communication signal from the power received from an inductive coupling module, wherein the communication signal comprises one or more frequencies that are higher than a fundamental frequency of an AC voltage waveform of the AC electrical power;

wherein the second group includes a sensor circuit in the vehicle.

4. The apparatus of claim 1, wherein the signal injection module is structured to inject a burst communication signal during the low electrical noise operating range, wherein the burst communication signal includes multiple messages for at least one of the first group or the second group.

5. The apparatus of claim 1, further comprising:

an AC-to-DC converter electrically coupled to the at least one inductive coupling module, wherein the AC-to-DC converter is structured to receive the AC electrical power and convert the AC electrical power to an output DC power, wherein the AC-to-DC converter is structured to provide the output DC power to a desired load in at least one of the first group and the second group;

wherein the AC power module comprises a DC-to-AC inverter structured to invert direct current ("DC") power from a DC voltage source to the AC electrical power.

6. The apparatus of claim 1, further comprising an AC voltage source structured to provide the AC electrical power to the AC power module.

7. The apparatus of claim 1, wherein the power distribution wiring harness includes a twisted-pair wiring harness for the vehicle.

8. The apparatus of claim 1, wherein the inductive coupling module includes an inductive coupler, wherein the inductive coupler is structured to receive the AC electrical power inductively from the power distribution wiring harness.

9. The apparatus of claim 8, wherein the inductive coupler includes a split-ring resonator.

10. A vehicle, comprising:

a battery structured to provide direct current ("DC") power;

an AC power module electrically coupled to the battery, the AC power module including a DC-to-AC inverter structured to invert the direct current power from the battery to alternating current ("AC") electrical power;

a power distribution wiring harness that includes at least two wires, the power distribution wiring harness electrically coupled to the engine and the AC power module, wherein the power distribution wiring harness is structured to receive AC electrical power from the AC power module;

a first group of loads;

a second group of loads, the second group consuming less power than the first group, wherein individual loads in the first group of loads are different than individual loads in the second group of loads;

a plurality of inductive coupling modules dedicated to at least one of the first group and the second group, wirelessly coupled to the power distribution wiring harness, and electrically coupled to at least one of the first group and the second group in the vehicle to inductively receive AC electrical power from the power distribution wiring harness and transmit the AC electrical power to at least one of the first group and the second group in the vehicle; and a signal injection module structured to inject a communication signal for a desired load of the second group on the power distribution wiring harness using signal modulation during a predefined electrical noise range of operation in the vehicle, wherein the predefined electrical noise range of operation corresponds with a low electrical noise operating range.

11. The vehicle of claim 10, further comprising a power storage device electrically coupled to the first group and structured to inductively receive AC electrical power from the power distribution wiring harness and to selectively provide electrical power to the first group.

12. The vehicle of claim 10, further comprising:

a signal receiver module structured to filter the communication signal from power received from the at least one inductive coupling module;

wherein the second group includes a sensor circuit for the vehicle.

13. The vehicle of claim 10, wherein the signal injection module is structured to inject a burst communication signal during the low electrical noise operating range, wherein the burst communication signal includes multiple messages for at least one of the first group and the second group.

14. The vehicle of claim 10, wherein the communication signal includes one or more frequencies that are higher than a fundamental frequency of an AC voltage waveform of the provided AC electrical power.

15. The vehicle of claim 14, wherein the one or more frequencies are between approximately 5 and 6 megahertz, and wherein the AC voltage waveform is less than or equal to 150 kilohertz.

16. The vehicle of claim 10, wherein the inductive coupling modules are structured to provide bi-directional communication, the bi-directional communication is structured to include providing the communication signal from the signal receiver module to an inductive coupling module and providing the communication signal from the inductive coupling module to the signal receiver module.

17. The vehicle of claim 10, wherein at least one inductive coupling module is electrically coupled to a fan and an air compressor, and wherein at least one another inductive coupling module is electrically coupled to an alternator.

18. A method, comprising:
providing, by an alternating current ("AC") power module, AC electrical power;
providing a first group of loads;
providing a second group of loads consuming less power than the first group, wherein individual loads in the first group of loads are different than individual loads in the second group of loads;
receiving, by a power distribution wiring harness in a vehicle, the AC electrical power;
receiving, by an inductive coupling module dedicated to at least one of the first group and the second group, the AC electrical power from the power distribution wiring harness, wherein the AC electrical power is received inductively from the power distribution wiring harness;
transmitting, by the inductive coupling module, the received AC electrical power to at least one of the first group and second group; and
receiving, by the power distribution wiring harness, a modulated communication signal during a predefined electrical noise range corresponding with a low electrical noise operating range.

19. The method of claim 18, further comprising
storing energy received via the inductive coupling module with a power storage device, and
selectively providing electrical power from the power storage device to at least one of the first group and the second group.

20. The method of claim 19, further comprising:
filtering, by the inductive coupling module, the modulated communication signal from the power received from the inductive coupling module;
wherein the second group includes a sensor circuit for the vehicle.

21. The method of claim 20, further comprising
providing, by the power distribution wiring harness, the modulated communication signal to the first inductive coupling module,
wherein the inductive coupling module is structured to provide the modulated communication signal to at least one of the first group and the second group.

22. The method of claim 18, further comprising
providing a burst communication signal during the low electrical noise operating range,
wherein the burst communication signal includes multiple messages for one or more of the first group or the second group.

\* \* \* \* \*